2,775,630

SEPARATING α-METHYLSTYRENES FROM ISOPROPYLBENZENES USING AMINES

Claude J. Schmidle, Moorestown, N. J., assignor to Rohm & Haas Company, Philadelphia, Pa., a corporation of Delaware No Drawing. Application February 11, 1953, Serial No. 336,452

5 Claims. (Cl. 260—669)

This invention deals with a process for separating α-methylstyrenes in admixture with isopropylbenzenes.

Mixtures of α-methylstyrenes and isopropylbenzenes are obtained, for example, in processes involving dehydrogenation of isopropylbenzenes. Removal of α-methylstyrenes from such mixtures has been difficult or expensive. Mixtures of these materials are also encountered in oxidation processes such as that involving formation of phenols by decomposition of cumene hydroperoxide. Here α-methylstyrene is found as a contaminant in the isopropylbenzene being recycled. Separation by distillation is not practical. This contaminant is removed by the process of this invention and the purified isopropylbenzene can be recycled.

The process of this invention can be applied for the utilization of para-cymene, a by-product from the sulfite pulping of spruce. Although a large amount of para-cymene is available, it is usually not recovered because of lack of demand. It can be dehydrogenated to yield a mixture of about equal parts of para-cymene and para-methyl-α-methylstyrene. These materials have been very difficult to separate. If, however, the mixture is treated by the process of this invention, the para-methyl-α-methylstyrene can be readily removed to yield useful products. The para-cymene from the mixture is readily recovered and recycled for dehydrogenation without the necessity of distillation.

The organic bases which are obtained by treating mixtures such as those described above are useful materials in the fields of insecticides, flotation, corrosion inhibitors, bactericides, and resin preparation.

By the process of this invention α-methylstyrenes are removed from mixtures of other materials by treating a mixture containing an α-methylstyrene with formaldehyde and a basic nitrogen compound having hydrogen on the nitrogen thereof in the presence of an acid as catalyst. The α-methylstyrene reacts to form the salt of a basic nitrogen compound, which is readily separable from other materials. Most conveniently the salt thus formed is taken up in a water layer. The other materials form an organic layer. The two layers are readily separated. The new nitrogen compound formed in the reaction can be used in the form of the salt or the salt obtained may be treated with an alkali to yield a basic nitrogen product.

As a basic nitrogen compound having hydrogen on the nitrogen, there may be used ammonia, a primary amine, or a secondary amine. The essential requirement is that the basic nitrogen compound have at least one hydrogen on the nitrogen available for reaction. The usual basic compounds may be represented by the formula

wherein R° and R<sup>x</sup> taken individually are hydrogen, alkyl groups, aralkyl groups, or cycloalkyl groups, and R° and R<sup>x</sup> taken together form a divalent aliphatic chain which with the nitrogen forms a monocyclic heterocycle which is ordinarily five- or six-sided, as in morpholine, thiamorpholine, pyrrolidine, piperidine, or the like. The divalent chains in these heterocyclic amines are

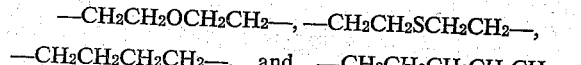

Equivalent heterocyclic amines carry substituents on these chains, such as alkyl groups, 3,5-dimethylmorpholine being an example. Other useful amines are methylamine, dimethylamine, ethylamine, diethylamine, butylamine, dibutylamine, amylamine, diamylamine, 2-ethylhexylamine, (tert.-octyl)amine, dodecylamine, dodecylmethylamine, cyclohexylamine, dicyclohexylamine, benzylamine, dibenzylamine, benzylmethylamine, N-methylaniline, piperazine, N-methylpiperazine, methylhydroxyethylamine, di(hydroxyethyl)amine, di(hydroxypropyl)amine, diethylaminoethylamine, morpholinoethylamine, ethylenediamine, trimethylethylenediamine, etc. Instead of a primary or secondary amine there may be used ammonia or ammonium hydroxide.

One or more of such reactive amino compounds may be taken or there may be used a salt of primary or secondary amine or ammonia. Thus there may be used ammonium chloride, ammonium bromide, or other salt of a strong acid. There may likewise be used an amine salt, such as methlamine hydrochloride or hydrobromide or the like. The salt supplies both the needed reactive basic nitrogen compound and the acid catalyst.

The reaction with an α-methylstyrene is catalyzed by strong acids including hydrochloric, hydrobromic, phosphoric, sulfuric, alkanesulfonic, arylsulfonic, etc. It may also be catalyzed with a monocarboxylic acid of not over three carbon atoms, such as acetic or propionic, although the organic acids do not give as rapid an effect as the above acids. There may also be used strongly acidic cation exchangers in their hydrogen form, including sulfonated coals, insoluble sulfonated phenolformaldehyde resins, and insoluble sulfonated styrene-polyvinylbenzene copolymers.

As has been indicated above, the acid catalyst may be added to a reactive amine or ammonia to form a salt. Alternatively, an acid catalyst may be directly added to the reaction mixture.

The acid catalyst is commonly used in an amount which is about equivalent to the nitrogen of the basic nitrogen-containing reactant, but more or less acid can be used. Some excess of free acid is generally, however, here advantageous.

The order of combining the catalyst, amine or ammonia, formaldehyde, and mixture containing an α-methylstyrene is not critical. As has been stated acid and amine or ammonia may be first combined and the resulting salt added to mixture and formaldehyde. Again, amine or ammonia may be first combined with formaldehyde. In this way water may be eliminated in advance. There may thus be used such substances as methylene bis(dimethylamine), methylene bis(diethylamine), 1,3,5-trimethylhexahydro-1,3,5-triazine, hexamethylenetetramine, tert.-octylazomethine, tert.-butylazomethine, and so on, which result from the reaction of primary amine or ammonia with formaldehyde. One of these compounds can be added to the mixture along with acid catalyst. Again amine or ammonia, formaldehyde, and mixture containing an α-methylstyrene may be combined in the presence of an acid catalyst.

The reaction is carried out at temperatures of about 50° to 150° C. The reaction mixture is worked up with separation of aqueous layer containing a salt of the nitrogen-containing compound formed from the α-methylstyrene and organic layer which is chiefly an isopropylbenzene, and which is recycled for further reaction, as by oxidation or dehydrogenation. The solution of the salt is worked up, usually by destroying the acid group, as by treating with an alkaline agent, such as sodium or potassium hydroxide or soda ash. The free basic nitrogen product can be obtained as a residue or it can be purified by distillation under reduced pressure.

Typical separations of α-methylstyrenes and recovery of isopropylbenzenes are described in the following illustrative examples. Parts are by weight.

*Example 1*

(a) The method of Kobe and Romans (Ind. Eng. Chem. 43, 1755 (1951)) is applied to the dehydrogenation of p-cymene by passing it at a space velocity of 3.05 volumes of liquid feed per hour per gross volume of catalyst over a chrome-alumina catalyst at 593° C. The product contains approximately 50% of p-methyl-α-methylstyrene.

(b) A portion of this mixture (136 parts) is stirred for five hours at 50°–60° C. with a mixture of 35 grams of ammonium chloride and 115 grams of aqueous 37% formaldehyde solution. The refractive index of the organic layer is then 1.4891, being originally 1.5085. Since the refractive index of pure p-cymene is 1.4872 at 25° C., the treated material is now about 95% p-cymene. The aqueous layer and organic layer are separated. The aqueous layer is made basic with ammonium hydroxide. A basic nitrogen compound separates as a viscous oil. It is distilled at 143°–155° C./5 mm.

The organic layer is returned to the catalyst unit and dehydrogenated as before, the resulting mixture being again treated as above.

*Example 2*

Dehydrogenation of p-cymene is carried out as above. The resulting mixture is treated by reacting 130 parts thereof with 34 parts of monomethylamine hydrochloride and 110 parts of aqueous 37% aqueous formaldehyde solution. The mixture is stirred and heated under reflux for three hours. The reaction mixture is cooled, treated with a little benzene, and allowed to separate into layers. The organic layer is stripped of benzene and the p-cymene thus recovered is available for recycling. The aqueous layer is made basic by adding 30% sodium hydroxide solution. A basic nitrogen compound separates. It is taken up in toluene. This solution is dried over potassium carbonate and distilled. The fraction taken at 130°–140° C./10 mm. is an amine of the composition $$CH_3C_6H_4C(CH_3)=CHCH_2NHCH_3$$

At 150°–160° C./10 mm. there is obtained a fraction which is a heterocyclic compound of the apparent formula 3,6-dimethyl-6-p-methylphenyltetrahydro-1,3-oxazine.

Replacement of the above methylamine hydrochloride with ethylamine hydrochloride likewise results in separation of the para-cymene from the dehydrogenated material. This material is converted into some N-p-methylphenylbutenyl-N-ethylamine and 3-ethyl-6-methyl-6-p-methylphenyltetrahydro-1,3-oxazine. The recovered p-cymene is as readily dehydrogenated as the original p-cymene.

In place of methylamine or ethylamine there may be used other primary amines. In each case the p-methyl-α-methylstyrene is reacted to form basic nitrogen compounds and p-cymene is recovered for recycling. In place of the hydrochloride other amine salts of strong acids may be used.

*Example 3*

With stirring and cooling there are mixed 73 parts of diethylamine and 31 parts of paraformaldehyde. This mixture is then combined with 400 parts of glacial acetic acid and 40 parts of orthophosphoric acid and the resulting combination is added to 600 parts of a mixture containing 19% of α-methylstyrene and the balance chiefly isopropylbenzene. The entire mixture is heated under reflux for six hours, then allowed to cool, and mixed with 1000 parts of water. The resulting layers are separated. The aqueous layer is extracted with a low boiling naphtha. The extract is combined with the organic layer, which is then stripped by heating under reduced pressure to yield isopropylbenzene. The aqueous layer is made alkaline with 50% sodium hydroxide solution. An oil separates which is taken up in benzene. The benzene solution of the oil is dried over calcium sulfate and distilled. After removal of the benzene, the main fraction is taken at 140°–146° C./25 mm. It consists of N,N-diethylaminophenylbutene, having a refractive index at 20° C. of 1.5130.

In the same way other secondary amines can be utilized for reacting with formaldehyde and mixtures containing an α-methylstyrene in the presence of an acid catalyst. The α-methylstyrene is removed from the mixture and the other substance or substances in the mixture can be used in any way desired.

While in the above examples the process of this invention has been directed to removal of α-methylstyrene from admixture with isopropylbenzene and removal of para-methyl-α-methylstyrene from admixture with para-cumene, the process can be applied to the removal of any α-methylstyrene from admixture with aromatic hydrocarbons and recovery of the aromatic hydrocarbons. The presence of substituents, such as halogen, in the aromatic nucleus does not change the reaction or the effectiveness of the process.

The process of this invention is directed to the removal of an α-methylstyrene from a mixture containing a said compound, particularly in admixture with another hydrocarbon. The process is carried out by bringing together the mixture containing an α-methylstyrene, formaldehyde, a basic nitrogen compound having on a nitrogen atom at least one hydrogen available for reaction, and an acid as catalyst. The exact order of bringing these materials together is not of significance, but rather a matter of convenience. The nature of the basic nitrogen compound other than that it contains a reactive hydrogen on the nitrogen is also not significant, except, perhaps, in so far as it is desired that definite products be formed. The reaction of the above materials in the presence of an acid as catalyst yields a salt which can be separated with recovery of the hydrocarbon. The process is advantageous in that it effects a separation which has heretofore been difficult or impractical.

I claim:

1. A process for removing an α-methylstyrene from a mixture containing an α-methylstyrene and an isopropylbenzene which comprises treating said mixture with formaldehyde and a basic nitrogen compound having on a nitrogen atom at least one hydrogen available for reaction from the class consisting of ammonia and lower primary alkylamines in the presence of hydrochloric acid as catalyst, reacting said α-methylstyrene, formaldehyde, and said basic nitrogen compound in the presence of said catalyst at a temperature between 50° and 150° C., whereby an acid salt of a nitrogen base is formed, separating said salt, and recovering the said hydrocarbon.

2. A process for removing α-methylstyrene from admixture with isopropylbenzene which comprises bringing together formaldehyde, a basic nitrogen compound having on a nitrogen atom at least one reactive hydrogen from the class consisting of ammonia and lower primary alkylamines, and the α-methylstyrene in admixture with isopropylbenzene, reacting together between 50° and 150° C. said formaldehyde, basic nitrogen compound, and α-methylstyrene in the presence of hydrochloric acid as catalyst, whereby an acid salt of a nitrogen base is formed, and separating said salt and isopropylbenzene.

3. A process for removing para-methyl-α-methylstyrene from admixture with para-cymene which comprises bringing together formaldehyde, a basic nitrogen compound having on a nitrogen atom at least one reactive hydrogen from the class consisting of ammonia and lower primary alkylamines, and the para-methyl-α-methyl-styrene in admixture with para-cymene, reacting together between 50° and 150° C. said formaldehyde, basic nitrogen compound, and para-methyl-α-methyl-styrene in the presence of hydrochloric acid as catalyst, whereby an acid salt of a nitrogen base is formed, and separating said salt and para-cymene.

4. A process for removing α-methylstyrene from admixture with isopropylbenzene which comprises bringing together formaldehyde, ammonia, a mixture containing α-methylstyrene and isopropylbenzene, and hydrochloric acid as catalyst, reacting these substances together between 50° and 150° C., whereby an acid salt of a nitrogen base is formed and separating said salt and isopropylbenzene.

5. A process for removing para-methyl-α-methyl-styrene from admixture with para-cymene which comprises bringing together formaldehyde, ammonia, a mixture containing para-methyl-α-methylstyrene and para-cymene, and hydrochloric acid as catalyst, reacting these substances together between 50° and 150° C., whereby an acid salt of a nitrogen base is formed, and separating said salt and para-cymene.

References Cited in the file of this patent

UNITED STATES PATENTS

| | | |
|---|---|---|
| 2,370,346 | Gluesenkamp | Feb. 27, 1945 |
| 2,647,117 | Hartough et al. | July 28, 1953 |
| 2,647,118 | Hartough et al. | July 28, 1953 |
| 2,652,429 | Hartough et al. | Sept. 15, 1953 |